J. WATSON.
SPRING WHEEL FOR VEHICLES.
APPLICATION FILED NOV. 10, 1921.

1,414,003.

Patented Apr. 25, 1922.

Inventor
James Watson
by Herbert W. J. Jenner,
Attorney.

UNITED STATES PATENT OFFICE.

JAMES WATSON, OF NOTTINGHAM, ENGLAND.

SPRING WHEEL FOR VEHICLES.

1,414,003.　　　　　　　Specification of Letters Patent.　　Patented Apr. 25, 1922.

Application filed November 10, 1921. Serial No. 514,187.

*To all whom it may concern:*

Be it known that I, JAMES WATSON, a subject of the King of Great Britain, residing at 94 Mansfield Road, in the city and county of Nottingham, in England, have invented certain new and useful Improvements in Spring Wheels for Vehicles, of which the following is a specification.

This invention relates to improvements in spring wheels for vehicles, of the kind in which a flexible elastic felloe or rim is connected to a concentric rigid rim of less diameter, by tensional connections such as flexible cables which will permit of the elastic rim approaching the rigid rim, but prevent at each of the points of attachment, any appreciable movement in the reverse direction. The present invention refers more particularly to the system employed for connecting the flexible cable to the elastic and rigid rim.

According to the present invention, the flexible cable or cables are connected to the respective rims by means of clips which are adapted to clamp and lock the cables at each point of attachment, and the latter are especially disposed with a view to taking the driving and braking as well as the lateral stresses, thus permitting of little or no appreciable movement of the elastic rim in either the rotational or lateral directions relatively to the rigid rim, without affecting the flexibility of the former in its function of yielding to and absorbing shocks.

In the accompanying drawings.

Figure 1:
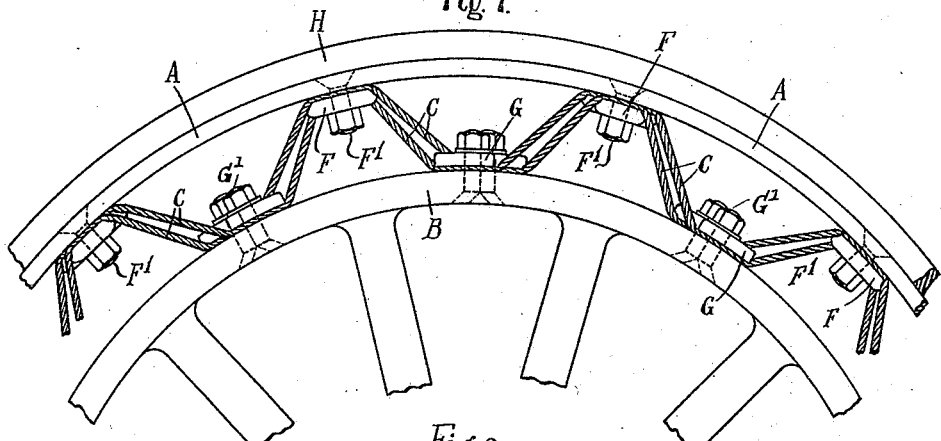

Fig. 1. is a side elevation showing a portion of a wheel construction according to my invention.

Figure 2:
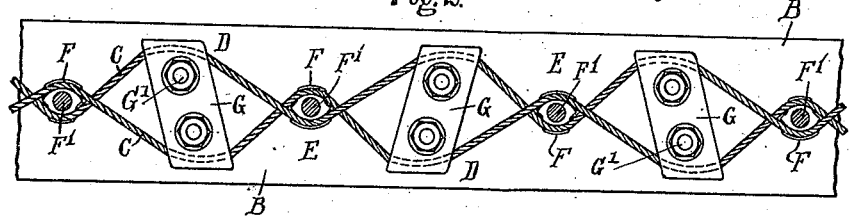

Fig. 2. is a diagram showing one arrangement of the wire cable connections.

Figure 3:
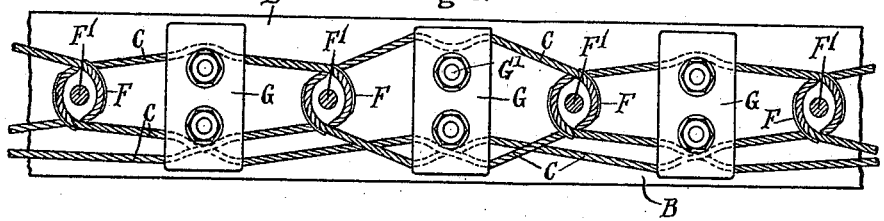

Fig. 3. is a diagram showing an alternative arrangement of the wire cable connections.

Figure 4:
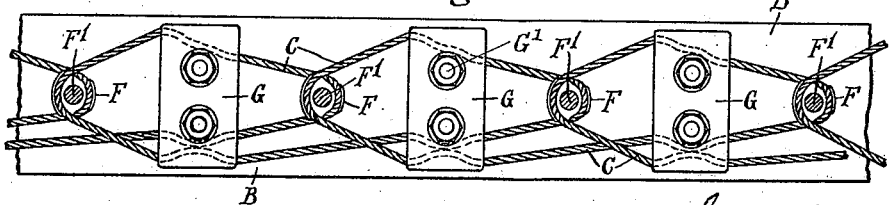

Fig. 4. is a diagram showing a further alternative arrangement of the cable connections.

Like letters indicate like parts throughout the drawings.

In the construction shown in Figs. 1 and 2, the outer elastic rim A is secured to a rigid rim B of less diameter, by a pair of stranded wire cables C, which are carried from one rim A to the other B in a zig-zag manner as shown, and permanently secured to the respective rims at each point. The ends of the cables C may be secured together or to either of the rims, and although both are or may be practically continuous all round the wheel, they form a series of independent cable connections between the rims A and B. The disposition of the cable connections as described effectually stays the elastic rim A against the driving and braking stresses.

The cables C may be continuous cables, or short lengths joined together in any approved way. The cables C have circumferentially arranged portions which are clamped against the periphery of the inner rim B near its side edges at predetermined points, by means of clip plates G and radially arranged bolts $G^1$. The cables have also circumferentially arranged portions which are clamped against the periphery of the outer rim A at its middle part, and intermediate of the clip plates G, by means of clip plates F and radial bolts $F^1$. The intervening portions of the cables C between the clip plates F and G extend in zig-zag form between the clip plates F and G alternately, and they are preferably arranged to cross each other at points adjacent to the bolts $F^1$.

In the form of the wheel shown in Fig. 2, two independent cables are provided, and each cable extends from the clip plates G near one edge of the rim to the clip plates F at points beyond the bolts $F^1$.

The cables C have curved loops arranged circumferentially of the bolts $F^1$ under the clips F, so that each bolt is midway between two of the loops.

In the form of the wheels shown in Figs. 3 and 4, only one cable is provided on each wheel, and each cable is wound into a series of relatively large loops, each of which has a single stretch clipped at one side of the inner rim, and two stretches or a pair of stretches clipped at the other side of the inner rim.

In Fig. 3 the stretches of each pair of stretches cross each other under the clip plate which secures them to the inner rim. The clip plates G are secured to the inner rim by radial bolts $G^1$. The clip plates F and G as shown are oblong in form, but may be of other approved form, and they are preferably curved to correspond with the curvature of the rims to which they are secured.

The cables shown in Figs. 3 and 4 have, at the ends of their large loops, sharply curved portions or loops which extend circumferentially of the radial clip bolts in a similar manner to the sharply curved portions or loops of the cables shown in Fig. 2, but the sharply curved portions or loops shown in Figs. 3 and 4 are arranged in positions crosswise of the positions of the corresponding parts shown in Fig. 2.

The outer rim A has a tire H of elastic material, but this tire may be omitted.

What I claim is:

1. In a spring wheel, an outer rim provided with radial clip bolts and clip plates, an inner rim provided with radial bolts and clip plates arranged alternately and out of line with the bolts and clips of the outer rim, and flexible connections having loops secured against the middle part of the outer rim by the clip plates and bolts pertaining to it and arranged circumferentially of and on opposite sides of the said clip bolts, said flexible connections having also longitudinal portions secured against the side portions of the inner rim by the clip plates and bolts pertaining to it, and having also intervening portions which extend in zig-zag form between the clip plates of the inner and outer rims.

2. A spring wheel as set forth in claim 1, in which two separate flexible connections are provided and arranged one on each side portion of the wheel.

In witness whereof I have hereunto set my hand in the presence of two witnesses.

JAMES WATSON.

Witnesses:
H. C. SHELDON,
L. A. SHELDON.